United States Patent [19]

McShane

[11] 4,069,433
[45] Jan. 17, 1978

[54] MODULAR TRANSDUCER ASSEMBLY

[75] Inventor: James L. McShane, Pittsburgh, Pa.

[73] Assignee: Westinghouse Electric Corporation, Pittsburgh, Pa.

[21] Appl. No.: 692,694

[22] Filed: June 3, 1976

[51] Int. Cl.² .......................................... H01L 41/04
[52] U.S. Cl. .................................... 310/325; 310/328
[58] Field of Search ................... 310/8.2, 8.3, 8.7, 9.1, 310/9.4; 73/194 A, 194 B, 67.5 R, 71.5 US

[56] References Cited

U.S. PATENT DOCUMENTS

| 3,890,423 | 6/1975 | Zacharias, Jr. | 310/8.3 |
|---|---|---|---|
| 3,925,692 | 12/1975 | Leschek et al. | 310/8.7 |
| 3,935,484 | 1/1976 | Leschek et al. | 310/8.2 |
| 3,942,049 | 3/1976 | Hyanova et al. | 310/8.7 X |
| 3,970,877 | 7/1976 | Russell | 310/8.3 |
| 3,989,965 | 11/1976 | Smith et al. | 310/8.2 |

Primary Examiner—Mark O. Budd
Attorney, Agent, or Firm—C. M. Lorin

[57] ABSTRACT

A flowmeter transducer assembly specially designed for high temperature operation includes only dry-coupled elements. A subassembly preassembled before installation on the pipe section consists of a piezoelectric element held between front and backing electrodes. The backing electrode is backed by a contact electrode while leaving a gap therebetween to prevent reflection of acoustic energy back to the rear of the transducer. The subassembly is introduced into a housing clamped directly on a flow section of a pipe, where the pipe wall is an acoustic wave transmitting or receiving window. In a different embodiment the pipe may serve as the front electrode in dry coupling.

9 Claims, 9 Drawing Figures

MODULAR TRANSDUCER ASSEMBLY

BACKGROUND OF THE INVENTION

The invention relates to acoustic transducers in general and more particularly to transducers for the transmission and reception of acoustic signals in a continuous wave mode or consisting of bursts having an oscillating portion at a selected frequency, as can be used for the detection of fluid velocity in a pipe, or conduit, or for non-destructive testing of material. There are applications for which a transducer must be dry-coupled in order to avoid any bonding or liquid coupling between the transducer components. This is particularly the case where the active components of the transducer are directly or indirectly exposed to high temperature, high pressure and corrosive fluid as can be found in liquid sodium installations or for the measure of sanitary fluid flow.

Dry-coupled transducers have been used successfully in travel time difference flowmeters operating under such severe conditions in the environment.

An example of such prior art transducers can be found in U.S. Pat. No. 3,925,692 of Walter C. Leschek et al for a "Replaceable Element Ultrasonic Flowmeter Transducer" assigned to the same assignee as the assignee of the instant patent application. The prior art transducer is provided with an acoustically transmissive metal window sealed at one end of the transducer housing. A coil spring is mounted in the housing to force an electrode member against the piezoelectric member and the latter against the metal window serving as the opposite electrode. A closure member is secured at the other end of the transducer housing in order to apply compression forces to the coil spring while allowing electrical connection therethrough.

When the transducer device is used with a high temperature, high pressure or corrosive transmissive medium, it is desirable that the acoustic window be made of a high temperature resistant high strength or chemically resistant material.

Moreover, high temperature forbids the use of adhesive bonding in the transducer component assembly at the back of the acoustic window. Still, it is desirable to hold the piezoelectric element in place and to provide good acoustic coupling between the window and the piezoelectric element. Also, the transducer assembly must be readily assembled in situ, and replacement of the piezoelectric element must be possible whenever necessary. To that effect, it is desirable to be able to assemble the transducer components with all the care possible outside the housing, and to hold such assembly together as a unit in preassembled form before actual installation within the housing.

In addition, while meeting mechanical requirements under severe conditions, the transducer assembly must possess all desirable acoustic requirements. For flowmeter applications, a pair of transducers is typically used as acoustic transmitter and receiver, respectively. Thus, in the receiver the piezoelectric element is usually sandwiched between the acoustic window serving as one electrode and a backing member serving as the second electrode. The latter should be structured so that it does not couple with the ultrasonic wave and reflect as much energy as possible back to the piezoelectric element in a resonant fashion, thereby to maximize transducer efficiency. Similar requirements exist for the transmitter and receiver transducers.

The invention is applicable to vortex flowmeter technique, but not exclusively.

Vortex flowmeters could not be effectively with high temperature, high pressure, corrosive, and sanitary fluid flow measuring applications, because mounting of the transducer and the strut creating the vortices had to be made through the pipe walls. As a result, seals were needed whereas sealing is best provided with an integral mounting of the strut, thus, without crevices inside the pipe. Crevices can create a problem in sanitary applications where a thorough internal cleaning is required and when the liquid sodium is used as fluid, for instance in nuclear applications, should the transducers or the strut be mounted through the pipe wall. Crevices could thus cause trouble.

Therefore, when transducers are mounted so as to penetrate into the pipe, they must be so designed as to withstand the internal environment. In the type of applications mentioned previously, this means that the transducers must be metal-enclosed and ruggedly constructed. Therefore, they will be relatively large and may seriously disturb the inner pipe surface contour and hence produce local turbulence which could mask the vortex effect. In general, it is desirable that the transducers be external to the pipe and that the installation of the strut be such as not to create crevices or reduce pressure capability. Bonding transducers to the outside of the pipe is a way to provide good acoustic coupling but the bonding agents often limit high temperature rating. Moreover, bonded transducers are not easily replaceable.

For a vortex flowmeter, it is also desirable to minimize acoustic coupling into the transducer parts located behind the transducer element. Standing wave conditions in certain parts could cause variations in the frequency response of the transducers, if appreciable energy happens to be coupled into them. As with standing waves in the fluid between transducers, the effect is to create narrow response peaks closely spaced in frequency within the main response band of the transducers. This can make tuning difficult and could cause sharp signal level changes for a small drift in the transmitting frequency.

SUMMARY OF THE INVENTION

The invention proposes a novel and unique transducer assembly adapted for dry-coupling of the transmitted, or received, ultrasonic waves against the outside surface of a pipe containing acoustic transmittory fluid in motion, the transducer having a good sensitivity at the operating frequency.

A subassembly is provided comprising a front window member serving as a first electrode, a piezoelectric element, and a second electrode serving as a backup member to the piezoelectric member held together as a unit, inserted within a housing mounted directly on a pipe section. The pipe wall serves as an additional front window with the first electrode. The subassembly is pressed in position against the pipe wall and electrically connected at the opposite end from the second electrode to an external potential source.

In another embodiment, two blocks are clamped around the pipe, each block having a housing, the longitudinal axis of which is oriented radially toward the pipe. The wall of the pipe in front of the housing is used as a transmitting window. The other components of the transducer assembly are stacked into the housing so that the piezoelectric element and the outside surface of the pipe wall abut and mate by dry contact. A backing electrode is mounted in physical contact with the piezoelectric element to allow electrical and mechanical connection therewith. A closing cap provided with an outside connector is secured at the opposite end of the housing and forces are applied by the closing cap to urge resiliently the contact member and the backing member within the housing against the piezoelectric element and the pipe wall. The pipe wall is providing one electrical connection between the external potential source and the piezoelectric element. The backing electrode is in two parts abutting in part and separated by a gap in order to provide air backing. Air backing is especially important when high temperature piezoelectric materials, such as lead metaniobate, are used because of their lower inherent sensitivity. Moreover, the desired performance is obtained, in accordance with the present invention, by using a backing piece whose thickness directly behind the piezoelectric element is an integral small number of half-wavelengths at the resonant frequency of the piezoelectric element, and by effectively having the backing piece air-backed. With half-wavelength thickness for the backing piece, the air-backing is effectively applied to the element as well. Coupling pressure is applied to a portion of the backing piece extending laterally. Only minimal acoustic energy is coupled into this portion of the backing piece.

A strut is provided across the pipe section for vortex flowmeter technique application. In order to avoid crevices or recesses inside the pipe which would not stand corrosion by the fluid, or high temperature, for an extended length of time, the strut is built within the pipe by a special technique. In one instance the strut is made by taking out material from the solid mass of the pipe, preferably by "electric discharge machining". In another instance, the strut is mounted within the pipe and the strut is welded in place with full-penetration welds through the walls. In either instance the strut is or becomes an integral part of the walls of the pipe.

More generally, an ultrasonic flowmeter is provided in which the transducers are dry-coupled to the outside surface of the flow section, and the strut is full-penetration welded, or is formed in place. The flow section may be simply a length of standard pipe with the strut added, but usually it has flat surfaces on opposite sides to facilitate coupling and to provide a resonant acoustic window thickness, e.g., of one or more half-wavelengths. A cup-shaped backing electrode, also having a resonant thickness over its center portion, provides coupling force and electrical contact to the piezoelectric element while effectively maintaining air-backed conditions, as desired for high ultrasonic signal levels. Coupling force is transmitted through the portion of the backing piece that extends beyond the center portion. The invention is particularly applicable where high temperature, high pressure or corrosive conditions are encountered, such as in sanitary applications, or for liquid sodium installations. The transducer assembly offers a smooth inside contour, and provides for easy transducer replacement.

DESCRIPTION OF THE PREFERRED EMBODIMENT

Figure 1B:
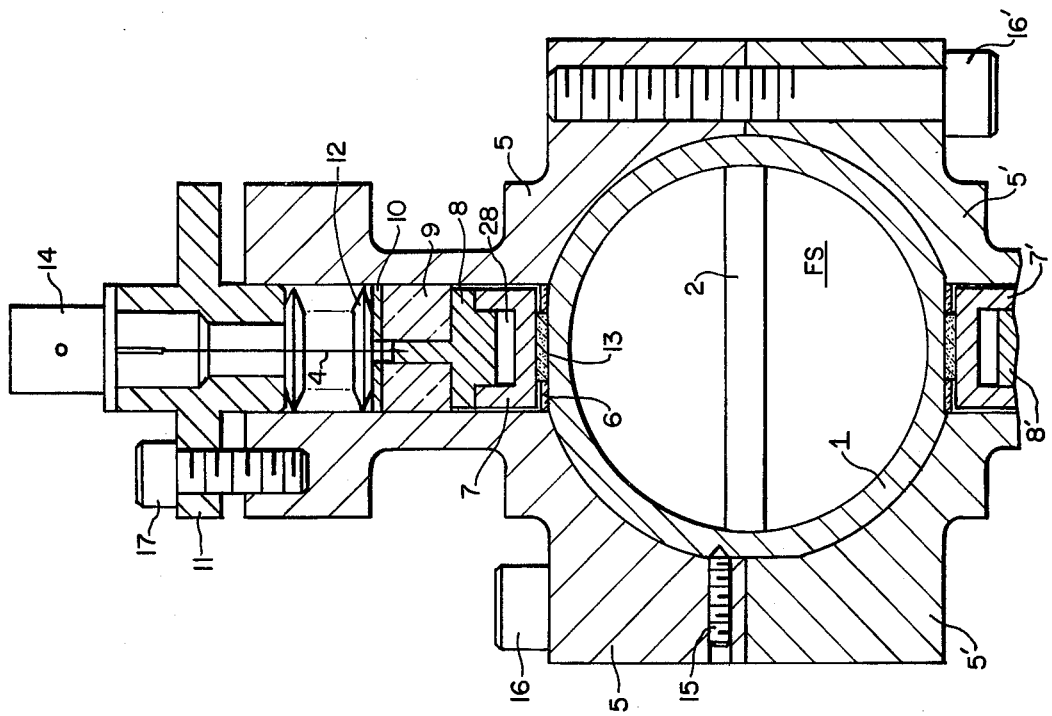
FIGS. 1A and 1B show the transducer assembly according to the invention installed on a flow section of a pipe.
Figure 1A:
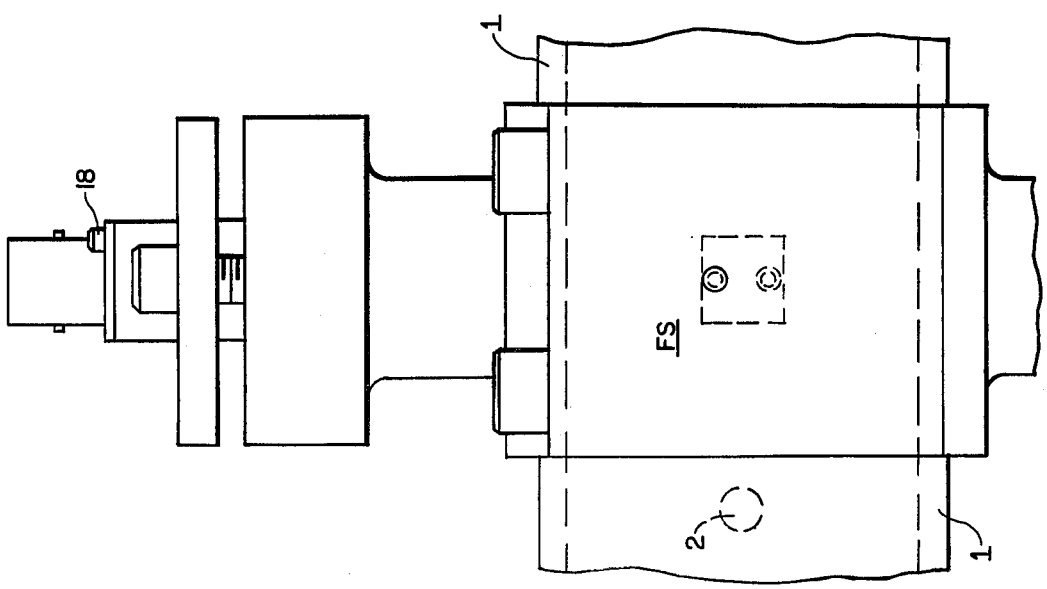
Figure 3B:
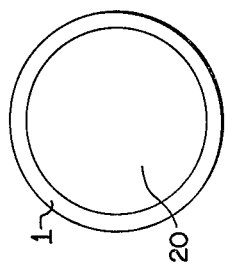
FIGS. 3A, 3B, 4A, 4B and 5A, 5B describe a technique which can be used to form a vortex generating obstruction across the section of the pipe ahead of the transducer assembly.
Figure 4B:
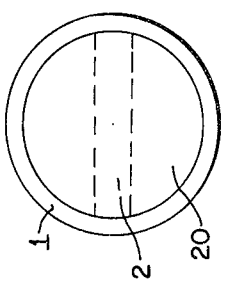
Figure 5B:
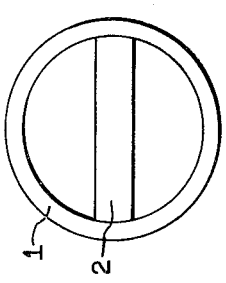
Figure 3A:
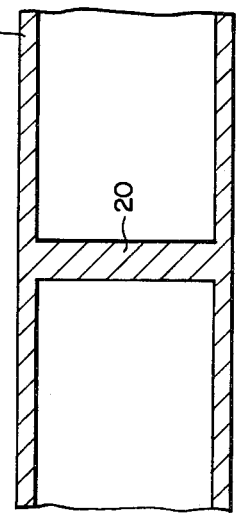
Figure 4A:
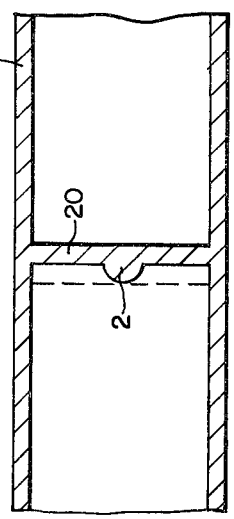
Figure 5A:
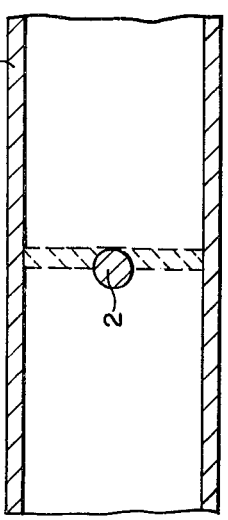

FIGS. 1A, 1B show the transducer assembly according to the present invention installed on a flow section. Minimum allowable wall thickness in the flow section determines the maximum fundamental transducer resonant frequency, since the acoustic window includes the flow section wall. While it is desirable to have a flat portion on the pipe, the reduction in thickness obtained may concurrently provide for a precise adjustment of the window resonant frequency (where $\lambda$ is the wavelength, $\lambda/2$ is the minimum wall thickness). Thus, for a standard 2 inch pipe, the wall thickness allows by mere surface reduction to obtain a desired 1 MHz operative frequency. The thickness of the center portion of the cup-shaped backing piece 7 is also $\lambda/2$ at $f = 1$ MHz, or a multiple of half-wavelengths, thereby to provide the required backing conditions. A major feature of the transducer according to the invention is the provision of dry-coupling forces without introducing any of the undesirable effects due to the backing block. These introduce higher mode (many wavelengths) standing waves or a reduction of sensitivity by comparison to air backing. Air backing is desired for improved signal level for a given transducer element. This is especially important when high temperature piezoelectric materials, such as lead metaniobate, are used because of their lower inherent sensitivity. Because of the curved inner pipe surface, the window has a range of thickness which broadens the frequency response, but this is a generally desirable result.

Housing 5 mates with an identical housing 5' belonging to the opposite transducer. The two housing are joined by bolts 16. Such a dual housing assembly surrounds a flow section FS, which could merely be the pipe 1, and balances the opposing coupling forces. Transducer positioning is provided by set screw 15 which fits into a small indentation machined into the flow section wall. A piezoelectric element 13 is located between a backing piece 7 and the flat window surface formed by the pipe wall. A ceramic washer 6, slightly thinner than the element, centers the element but does not support any of the coupling forces.

Coupling force is produced by tightening the screws 17 to cause an end cap 11 to compress disc springs 12. The force is transmitted through a top plate 10, insulating spacer 9, contact 8, and backing piece 7 to the element 13. The flat washer distributes the force on the ceramic spacer. The ceramic insulating spacer 9 centers and electrically isolates the contact, which in turn centers the backing piece. A wire 4 connected from contact 8 to the center terminal of connector 14 provides an electrical connection with the element. The other side of element 13 is at the potential of the pipe and housing.

Because the transducer is generally used in the CW mode, and the frequencies there used are relatively low compared to the operative mode used in pulse applications, such as in the aforesaid Leschek patent relative to dry-coupled transducers, the surface flatness and finish here need not be exceptionally good. Grinding can be used, but coupling surfaces machined by milling or turning are also adequate. It is possible by taking good care of surface preparation to improve the apparatus sensitivity. For considerably higher transducer frequencies, high quality finishes are desirable. Improved quality in the surface finish improves the overall sensitivity and this is most desirable for high fidelity frequency transducers.

Figure 2:
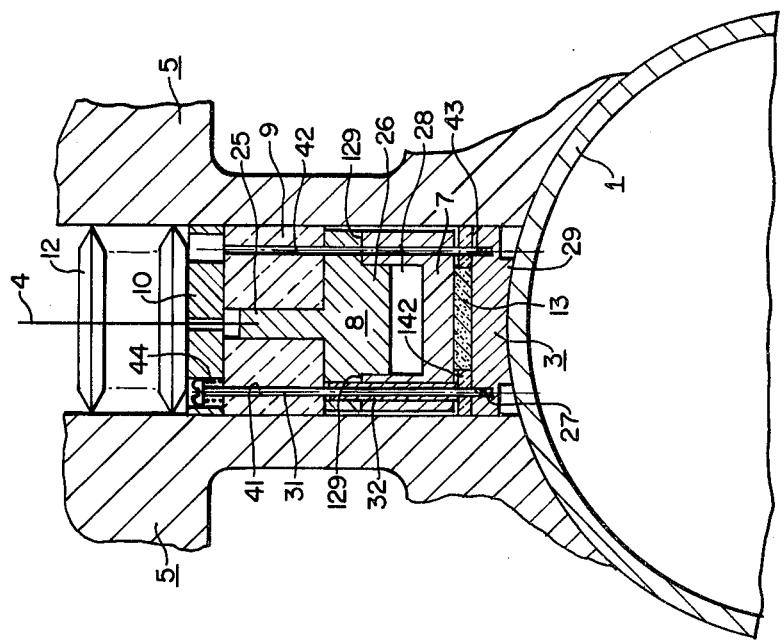
FIG. 2 shows a variation of the transducer assembly of FIGS. 1A, 1B, provided by the insertion of an adaptor between the piezoelectric element and the wall of the pipe and it illustrates the concept of using a transducer subassembly to be inserted at the last moment within the housing.

It is possible to adapt the transducer shown in FIGS. 1A, 1B to a different pipe surface by inserting a solid metal member 3 serving as electrode between the element and the window. This solution is shown in FIG. 2. The electrode member could provide thermal isolation from the pipe. Its thickness, like the wall thickness, is an integral number of half-wavelengths.

The electrode member 3 is specially shaped in order to fit the curved surface of the pipe and thus eliminate the need for pipe surface modifications. To minimize coupling force, the surface which mates with the pipe surface has an area only about as large as the piezoelectric element 13, as shown at 29.

For maximum transducer response at the window thickness resonance, a flat region could be machined on the inside of the pipe as well as on the outside. Such region would be approximately the size of the transducer element and could be produced by the electric discharge machining (EDM) technique. Alternatively, flat windows could be welded or brazed into a hole cut through the pipe.

In order to avoid excessive standing waves in the fluid inside the pipe, that can be caused by reflections in the line of the acoustic path, transducers could be offset laterally, axially, or by rotation around the pipe axis. They could also be mounted at an angle other than 90° to the pipe surface. The mounting angle could be selected so as to enhance the vortex modulation waveshape.

To allow full penetration welding, the holes in the pipe and the ends of the round strut are tapered. Welding, when completed for full elimination of any recess, meets the requirements for equipment to be installed in a sodium loop.

For complete non-penetration, the strut could be machined integrally from the pipe in place, also by the EDM technique, as schematized at three different stages of material removal from a wall 20 across the pipe in FIGS. 3A, 3B, 4A, 5A, 5B. The EDM tool face would be flat with a diametrical semi-circular groove, to produce the round strut as shown. Other strut cross-sectional shapes, particularly "bluff body" shapes, could also be produced by the same process.

Referring again to FIG. 2, the transducer according to the present invention is illustrated as a subassembly mounted in a housing 5 against the pipe wall 1. The subassembly comprises a front electrode 3, a piezoelectric element 13, a backing electrode 7 and a contact member 8, an insulating ceramic member 9 and a top plate 10 which are stacked together, and held as a unit by screws along two axes 41, 42 such as screw 31 along axis 41 in FIG. 2. The screw 31 is engaged in a thread 27 within an orifice of the front electrode 3 and passes through the top plate 10, the ceramic member 9, contact member 8 and backing electrode 7. Screw 31 crosses the gap left outside the piezoelectric element 13 sandwiched between backing electrode 7 and electrode 3. A ceramic ring 42 is inserted around the piezoelectric element 13 in order to hold the element in a centered position. Openings 43 allow the passing of the screws through the ceramic ring along either axes 41, 42. The head of screws 31 are resting on a spring 44 imparting resiliency to the mounting between top plate 10 and front electrode 3. Contact member 8 is provided with two central extending portions 25 and 26 at the opposite ends thereof. Portion 25 fits into a central opening of ceramic member 9. Portion 26 is coupled with the mouth of a recess on the back of backing electrode 7, while leaving a gap 28 therebetween. At the periphery, backing electrode 7 abuts with contact member 8 in a common transversal plane 29. The purpose of gap 28 is to minimize reflection of energy back at the rear of the transducer. The thickness of backing electrode 7, like the thickness of front electrode 3 is such that at the operating frequency of the transducer, each thickness corresponds to a small multiple of half-wavelengths. Acoustic operation is mainly due to the portion of the backing electrode 7 extending along the air gap 28. Reflection of energy back to the rear of the transducer is thus prevented by the air gap 28. As a result, the purpose of contact member 8 besides electrical contact is only to transmit mechanical forces from the main spring 12 and top plate 10 along the abutting surface 29 and to center the subassembly with the assist of the ceramic member 9 and the screws 31 inside the housing 5. Such centering effect is obtained by the relative radial dimensions of ceramic member 9 and components 3, 7, 8. These are such that while ceramic member 9 engages the inner wall of housing 5 tightly after the subassembly has been inserted therein, components 3, 7, 8 do not lean at all against the inner wall. The centering action obtained by the effect of the narrow portions 25, 26 of contact member 8 and by the screws 31 along axes 41, 42. It appears from FIG. 2 that the subassembly is shown in place within the housing 5 in the same fashion as in FIG. 1. A wire 4 is connected to the upper portion 25 of contact member 8 then passed upward through the main spring 12 toward the center terminal of connector 14 (shown in FIG. 1). It is understood, however, that in the embodiment of the invention shown in FIG. 2, the top plate 10, ceramic member 9, contact member 8, backing electrode 7, piezoelectric element 13 and front electrode 3 are preassembled with the screws 31, so that subassembly can be prepared, adjusted and tested before it is inserted as a unit within the housing 5. Once the housing has been clamped on the pipe and the end cap 11 has been closed so as to compress the main spring 12 against the subassembly in situ, portion 29 of the front electrode rests into full engagement with the outside surface of the pipe wall. Protruding portion 29 presents a concave surface which has been specially prepared and polished to match the external surface of the pipe at the desired location of the flow section FS.

The transducer housing 5 could be clamped, or bonded, against the pipe, or it could be mounted on the pipe by means of welded studs, or tapped holes. Also the housing could be made small and light in construction.

Types of signals other than CW can also be used, such as tone bursts and shock-excited pulses. The transducer design is also advantageous for propagating other types of signals such as may be used when vortices are detected by means other than amplitude modulation of a CW signal. Indeed, the transducer according to the invention is not limited to vortex flowmeters.

For lower cost, or for certain corrosive liquids, a plastic pipe may be more suitable, which would not impair the effectiveness of the front electrode 3 shown in FIG. 2.

I claim:

1. A unitary transducer assembly operative with a housing having first and second openings about a common axis, and operative with a fluid flow section of a pipe having a wall facing one of said openings, comprising the following stacked and dry-coupled elements disposed along said axis, radially toward said wall a piezoelectric cell sandwiched between a first and a second electrode; said second electrode being adapted for mating with said wall to serve as a front acoustic window in relation to said piezoelectric cell; said first electrode serving as a backing member for said piezoelectric cell; an insulating member and an end plate; said insulating member being disposed between said first electrode and said end plate; an electrical connection being provided for said first electrode through said insulating member and said end plate; and means for mechanically connecting said end plate with said second electrode to hold all of said elements together as a unit.

2. The transducer assembly of claim 1 in combination with a housing mounted on said pipe section, comprising: a closure member mounted on said housing and resilient means between said closure member and said plate for enforcing dry-coupling within said assembly by urging said second electrode against said pipe wall; a first electrical terminal of an external potential source being provided on said housing and an electrical connector for connecting said first electrode to said first electrical terminal; said second electrode being connected to a second terminal of said external source.

3. The transducer assembly of claim 2 with said first electrode including an electrical contact member having a thickness of at least one half wavelength at the operating frequency of said piezoelectric cell and a backing member, said contact member and said backing member being separated by a gap along major transversal cross-section thereof and being in physical and electrical contact along a minor transversal dimension thereof, said closure member and resilient means applying forces for dry-coupling along said minor transversal dimension.

4. The combination of claim 3 further including a strut disposed integrally across said pipe, said assembly being mounted in said housing a predetermined distance away from said strut along said pipe flow section for operation with ultrasonic waves modulated by vortices created in the fluid of the pipe by said strut.

5. A transducer assembly adapted for mounting upon a pipe section having an axis and containing fluid, comprising:

at least one mounting block having a surface for mating with said pipe section, a bore within said block extending between two opposite openings thereof and about an axis transverse to said pipe section axis, one of said openings being on the side of said mating surface;

a plurality of transducer elements including one electrode member and a piezoelectric cell having a front and a back face, said back face facing said one electrode member, said elements being stacked in said bore and along said transverse axis, the smallest dimension of said bore being at least as wide as the piezoelectric cell;

means mounted on said block for resiliently applying forces upon said stacked elements along said transverse axis and toward said surface; and means for securing said block upon said pipe along said surface so that the front face of said piezoelectric cell directly engages the wall of said pipe section under said applied forces.

6. The transducer assembly of claim 5 with said transducer elements including a backing contact member associated with said one electrode member for electrical and physical contact therewith, a gap being provided therebetween along a major transversal portion of said one electrode member; the thickness of the wall of said pipe and the thickness of said one electrode member along said major transversal portion thereof being each equal to at least one half wavelength at the operating frequency of said piezoelectric cell; said pipe section serving as the other electrode associated with said piezoelectric cell.

7. The transducer assembly of claim 6 with said one electrode being provided with a spacer portion for electrically connecting said one electrode to a potential source and for mechanically transmitting said applied forces.

8. The transducer assembly of claim 7 with said elements including an insulating member for centering said one electrode about said transverse axis for insulating said one electrode from said housing and for transmitting said applied forces to said backing contact member and one electrode member.

9. The transducer assembly of claim 7 with said elements further including an isolating spacer member interposed between said one electrode member and said pipe wall, for centering said piezoelectric cell therebetween.

* * * * *